(12) United States Patent
Lee et al.

(10) Patent No.: US 11,254,805 B2
(45) Date of Patent: Feb. 22, 2022

(54) ECO-FRIENDLY FLOORING AND METHOD FOR MANUFACTURING SAME

(71) Applicant: WAPS CO., LTD., Busan (KR)

(72) Inventors: Jae Chun Lee, Busan (KR); Sang Hoon Ha, Busan (KR)

(73) Assignee: WAPS CO., LTD, Busan (KR)

( * ) Notice: Subject to any disclaimer, the term of this patent is extended or adjusted under 35 U.S.C. 154(b) by 192 days.

(21) Appl. No.: 16/487,250

(22) PCT Filed: Sep. 13, 2017

(86) PCT No.: PCT/KR2017/010060
§ 371 (c)(1),
(2) Date: Aug. 20, 2019

(87) PCT Pub. No.: WO2019/054527
PCT Pub. Date: Mar. 21, 2019

(65) Prior Publication Data
US 2020/0017663 A1  Jan. 16, 2020

(51) Int. Cl.
| | |
|---|---|
| *C08L 9/06* | (2006.01) |
| *B29C 48/21* | (2019.01) |
| *B29C 48/07* | (2019.01) |
| *B32B 27/08* | (2006.01) |
| *B32B 27/20* | (2006.01) |
| *B32B 27/32* | (2006.01) |
| *B32B 37/02* | (2006.01) |
| *B32B 37/10* | (2006.01) |
| *B32B 27/42* | (2006.01) |
| *B32B 27/16* | (2006.01) |
| *B32B 27/06* | (2006.01) |
| *B29C 48/00* | (2019.01) |
| *B32B 27/28* | (2006.01) |
| *B32B 27/30* | (2006.01) |
| *B32B 37/15* | (2006.01) |
| *E04F 15/10* | (2006.01) |
| *B29K 9/06* | (2006.01) |
| *B29K 23/00* | (2006.01) |
| *B29L 31/00* | (2006.01) |

(52) U.S. Cl.
CPC ............ *C08L 9/06* (2013.01); *B29C 48/0021* (2019.02); *B29C 48/21* (2019.02); *B32B 27/08* (2013.01); *B32B 27/20* (2013.01); *B32B 27/285* (2013.01); *B32B 27/302* (2013.01); *B32B 27/308* (2013.01); *B32B 27/32* (2013.01); *B32B 37/02* (2013.01); *B32B 37/10* (2013.01); *B32B 37/153* (2013.01); *E04F 15/107* (2013.01); *B29K 2009/06* (2013.01); *B29K 2023/065* (2013.01); *B29K 2023/0625* (2013.01); *B29K 2023/12* (2013.01); *B29L 2031/732* (2013.01); *B32B 2250/24* (2013.01); *B32B 2305/30* (2013.01); *B32B 2307/306* (2013.01); *B32B 2307/584* (2013.01); *B32B 2307/734* (2013.01); *B32B 2323/043* (2013.01); *B32B 2323/046* (2013.01); *B32B 2323/10* (2013.01); *B32B 2325/00* (2013.01); *B32B 2333/12* (2013.01); *B32B 2371/00* (2013.01); *B32B 2419/04* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 7,494,713 B2 | 2/2009 | Song et al. | |
| 9,833,974 B2 | 12/2017 | Kwon et al. | |
| 2014/0290171 A1* | 10/2014 | Vermeulen | ............... B05D 3/12 52/578 |
| 2018/0044925 A1* | 2/2018 | Koh | ........................ B32B 9/002 |

FOREIGN PATENT DOCUMENTS

| | | |
|---|---|---|
| JP | 2013133337 A | 7/2013 |
| JP | 5844138 B2 | 1/2016 |
| KR | 100529785 B1 | 11/2005 |
| KR | 20110103813 A | 9/2011 |
| KR | 101302335 B1 | 8/2013 |
| KR | 20130141860 A | 12/2013 |
| KR | 200470687 Y1 | 1/2014 |
| KR | 101395714 B1 | 5/2014 |

OTHER PUBLICATIONS

Korean Intellectual Property Office, International Search Report with Written Opinion issued in PCT/KR2017/010060, dated May 24, 2018, 10 pages, Korean Intellectual Property Office, Daejeon, Republic of Korea.

* cited by examiner

*Primary Examiner* — Sheeba Ahmed
(74) *Attorney, Agent, or Firm* — Marshall & Melhorn, LLC (57) ABSTRACT

Described herein is flooring formed of an eco-friendly material, where the flooring has excellent heat resistance, durability, abrasion resistance and dimensional stability, and is formed of a non-PVC material and thus is recyclable via an extrusion processing at the time of disposal after use. Specifically, eco-friendly flooring is described in which a coating layer, an overlayer having ionomers, a printing layer, at least one middle layer, and at least one underlayer are laminated in order, where the overlayer of the flooring has ionomers, at least one of the middle layer and the underlayer has a thermoplastic polyolefin-based resin, a styrene-based resin, oil, and a filler, the thermoplastic polyolefin-based resin is contained in an amount of 50 to 150 parts by weight with respect to 100 parts by weight of the styrene-based resin, and the styrene-based resin may contain 25 to 45% styrene.

8 Claims, 3 Drawing Sheets

ECO-FRIENDLY FLOORING AND METHOD FOR MANUFACTURING SAME

TECHNICAL FIELD

The present invention relates to novel environmentally-friendly flooring, and more particularly, to novel environmentally-friendly flooring which has high heat resistance, durability, abrasion resistance, and dimensional stability and is made of other materials rather than polyvinyl chloride (PVC), that is, an environmentally-friendly material that is recyclable when being discarded after use.

BACKGROUND ART

Due to recent improvements in standards of living, flooring including timber, i.e., a patterned wood or flooring including a synthetic resin layer made of a polyvinyl chloride (PVC) resin with high workability is widely used in a floor surface of a building. The PVC resin is a material widely used in various fields due to high workability thereof.

However, since the PVC resin contains a chlorine (Cl) component, a large amount of chlorine gas and smoke are generated in case of fire, which is fatal to a human body. In addition, environmental hormones are generated in actual use after the installation the flooring is completed, and harmful substances such as dioxin are generated when the flooring is incinerated. Furthermore, a volatile organic compound (VOC) and formaldehyde (HCHO), which are toxic agents that cause a sick house syndrome, are generated by di-isodecyl phthalate (DOP) added to the flooring so as to process the PVC resin, which is harmful to the human body. Physical properties such as weather resistance and flexural rigidity due to inherent physical properties of the PVC resin are degraded, resulting in problems in use of a product.

Therefore, there is an urgent need to develop environmentally-friendly polyolefin-based flooring, which is harmless to the human body unlike the flooring of the related art using a thermoplastic polyolefin-based resin, does not generate harmful substances such as environmental hormones and dioxins caused by the flooring of the related art made of the PVC resin, does not use DOP to prevent a sick house syndrome phenomenon, promote human health, and be environmentally-friendly, and in which weather resistance, flexibility, and flexural rigidity of a complete product are increased, printability is increased to increase the beauty of the floor, and workability is increased, and a method of manufacturing the same.

In addition, dimensional stability should be considered when novel flooring is designed. Dimensional stability may be degraded due to the expansion or contraction caused by environmental factors such as external temperature and humidity. A gap is generated at a connection portion between the floorings due to the contraction and a surface of the flooring frequently rises like a wave due to the expansion frequently, which makes it difficult for the flooring to be continuously and stably used. Furthermore, in the case of typical flooring in which sheets or films are laminated in multiple layers, the films or sheets between layers may have different thermal expansion coefficients, which may cause a serious problem in that a shape of the flooring is distorted.

As a solution to the above problems, Korean Patent No. 10-1302335 proposes flooring including a surface layer sheet made of a biomass biodegradable resin such as a polylactic acid as a non-PVC material, an interlayer sheet including a printing layer, a fiber-reinforced resin layer sheet made of a thermosetting acrylic resin and a glass fiber, a biodegradable foamed elastic layer sheet, a biodegradable underlayer sheet, and the like, which are laminated. However, since abrasion resistance is very low and the fiber-reinforced resin layer sheet made of different materials is inserted to reinforce dimensional stability, the flooring is incapable of being recycled through extruding when being discarded.

In addition, Korean Patent No. 10-1395714 proposes lamination flooring including an aqueous UV coating layer, an upper layer, a dimensional reinforcing layer, a foam layer, and an underlayer. Environmental friendly elements using a polyolefin resin as a non-PVC material are added to the upper layer, the foam layer, and the underlayer, but the polyolefin resin used in the upper layer has very low abrasion resistance and dimensional stability as compared with the conventional PVC. Furthermore, the lamination flooring was manufactured by impregnating thermosetting resins such as a urethane resin, an acrylic resin, and a melamine resin into a glass fiber (woven or nonwoven fabric typically made of a glass fiber) impregnated with a thermosetting urethane resin, which is a different material, by using a roll coater, and then heating and curing the glass fiber at a certain temperature (see Korean Patent No. 10-1302335, Example 1, and Korean Utility Model Registration No. 20-0470687). Different thermosetting materials are used in a UV coating layer, the flooring is incapable of being recycled through extruding when being discarded.

As described above, research and development have been continued on environmentally-friendly flooring made of a non-PVC material, but in order to secure dimensional stability, a dimensional reinforced layer sheet made of different materials has been introduced. In order to improve abrasion resistance, a UV curable coating layer made of different materials has been introduced, and as a result, due to a uni-material, true environmentally-friendly flooring, which is recyclable through extruding when being discarded, has not appeared yet. Therefore, there is an urgent need for the appearance of a creative method capable of solving the above-mentioned problems at one time by providing high abrasion resistance, durability, and dimensional stability using a non-PVC material.

DISCLOSURE

Technical Problem

The present invention is directed to providing novel flooring which has high heat resistance, durability, abrasion resistance, and dimensional stability and is made of an environmentally-friendly material as a non-PVC material that is recyclable through extruding when being discarded after use.

In addition, the present invention is directed to providing flooring which has a high shock absorbing property, elastic force, and restoring force and is capable of reviving a smooth texture and pattern.

Technical Solution

According to an embodiment of the present invention, environmentally-friendly flooring includes a coating layer; an upper layer including an ionomer; a printing layer; at least one intermediate layer; and at least one underlayer, which are sequentially laminated, wherein the upper layer includes the ionomer, at least one of the intermediate layer and the underlayer includes a thermoplastic polyolefin-based resin, a styrene-based resin, oil, and a filler, the thermoplastic polyolefin-based resin is included in an amount of 50 parts by weight to 150 parts by weight with respect to 100 parts by weight of the styrene-based resin, and the styrene-based resin includes styrene in an amount of 25% to 45%.

According to an embodiment of the present invention, the styrene-based resin may include the styrene in the amount of 25% to 35%.

According to an embodiment of the present invention, at least one of the intermediate layer and the underlayer additionally may include 10 parts by weight to 40 parts by weight of at least one engineering plastic resin with respect to 100 parts by weight of the styrene-based resin, wherein the at least one engineering plastic resin is selected from polyethersulfone (PES), polyether ether sulfone (PEES), polyetherimide (PEI), polyphenylene oxide (PPO), polyacetal (POM), polyamide (PA), polycarbonate (PC), polysulfone (PSF), polyphenylene sulfide (PPS), polyamideimide (PAI), polyacrylate (PAR), polyketone (PK), polyethylene terephthalate (PET), polybutylene terephtalate (PBT), nylon (NA), polyimide (PI), polyetheretherketone (PEEK), and a liquid crystal polymer (LCP).

According to an embodiment of the present invention, at least one of the intermediate layer and the underlayer additionally may include 10 parts by weight to 50 parts by weight of thermoplastic vulcanizate (TPV) with respect to 100 parts by weight of the styrene-based resin.

According to an embodiment of the present invention, at least one of the intermediate layer and the underlayer may include 500 parts by weight to 1,500 parts by weight of the filler and 100 parts by weight to 300 parts by weight of the oil with respect to 100 parts by weight of the styrene-based resin.

According to an embodiment of the present invention, the styrene-based resin may include at least one selected from poly(styrene-b-butadiene-b-styrene) (SBS), poly(styrene-b-isoprene-styrene) (SIS), poly(styrene-butylene-b-butadiene-b-styrene) (SEBS), and poly(styrene-b-ethylene-b-propylene-b-styrene) (SEPS).

The thermoplastic polyolefin-based resin may include one selected from polyethylene, polypropylene, MAH-PP (Maleic Anhydride-PP), LLDPE (Linear Low-Density Polyethylene), HDPE (High-Density Polyethylene) and mixtures thereof.

According to an embodiment of the present invention, one or more dimensional stability layers may be additionally provided between the intermediate layer and the underlayer and/or below the underlayer.

One or more primer layers may be provided between the coating layer, the upper layer, the printing layer, the intermediate layer, and the underlayer.

A shrinkage rate of the upper layer may be in a range of 0.7% to 0.9% in a flow direction and in a range of 0.2% to a 0.4% in a vertical direction.

According to an embodiment of the present invention, a method of manufacturing environmentally-friendly flooring includes:

(a) providing an upper layer including an ionomer and a printing layer;

(b) co-extruding the upper layer and the printing layer to mold a first sheet;

(c) preparing a resin composition including 50 parts by weight to 150 parts by weight of a thermoplastic polyolefin-based resin with respect to 100 parts by weight of a styrene-based resin and manufacturing a second sheet and a third sheet constituting an intermediate layer and an underlayer pressed from the resin composition; and (d) sequentially laminating and pressing the first sheet, the second sheet, and the third sheet manufactured in (a) and (b).

The first sheet, the second sheet, and the third sheet may be pressed through a press process.

Advantageous Effects

Novel flooring according to the present invention has high heat resistance, durability, abrasion resistance, and dimensional stability and is made of an environmentally-friendly material as a non-PVC material that is recyclable through extruding when being discarded after use.

In addition her, the flooring according to the present invention uses an upper layer including an ionomer and a poly-thermoplastic polyolefin-based resin, thereby exhibiting high mechanical strength and concurrently exhibiting a smooth texture and a unique pattern.

BEST MODE OF THE INVENTION

Hereinafter, the present invention will be described in detail. Hereinafter, a configuration of the present invention will be described in detail with reference to the accompanying drawings. The following drawings to be described below are provided by way of example so that the idea of the present invention can be sufficiently transferred to those skilled in the art to which the present invention pertains. Therefore, the present invention may be implemented in many different forms, without being limited to the drawings to be described below. Here, unless technical and scientific terms used herein are defined otherwise, they have meanings generally understood by those skilled in the art to which the present invention pertains. Description of known functions and components that may unnecessarily obscure the gist of the present invention will be omitted from the following description and the accompanying drawings.

Novel environmentally-friendly flooring according to the present invention has high heat resistance, durability, abrasion resistance, and dimensional stability and is made of an environmentally-friendly material as a non-PVC material that is recyclable through extruding when being discarded after use An embodiment of the present invention relates to environmentally-friendly flooring including a coating layer, an upper layer including an ionomer, a printing layer, at least one intermediate layer, and at least one underlayer, which are sequentially laminated. The upper layer of the flooring may include the ionomer. The at least one of the intermediate layer and the underlayer may include a thermoplastic polyolefin-based resin, oil, and a filler. The thermoplastic polyolefin-based resin may be included in an amount of 50 parts by weight to 150 parts by weight with respect to 100 parts by weight of a styrene-based resin. The styrene-based resin may include styrene in an amount of 25% to 45%.

Figure 1:
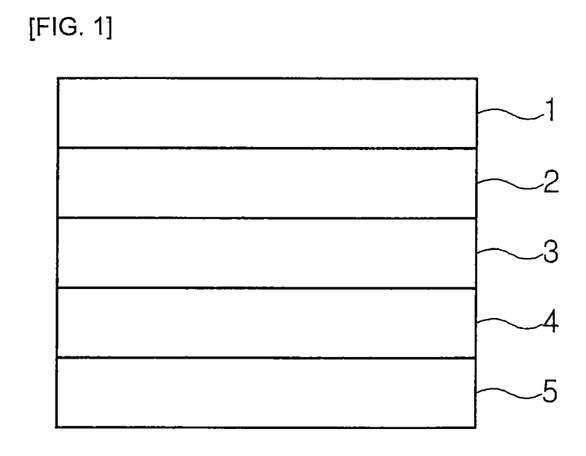
FIG. 1 is a cross-sectional view illustrating a first aspect of environmentally-friendly flooring of the present invention.

FIG. 1 illustrates a first aspect of the present invention, which sequentially includes the coating layer, the upper layer, the printing layer, the intermediate layer, and the underlayer.

The intermediate layer and/or the underlayer of the flooring according to the present invention include the thermoplastic polyolefin-based resin. The thermoplastic polyolefin-based resin may include various known types. Desirably, the thermoplastic polyolefin-based resin may include a polyethylene PE, polypropylene (PP), or rubber elastomer resin group, but the present invention is not limited thereto. For example, the thermoplastic polyolefin-based resin may include at least one resin selected LDPE, EVA, HDPE, LLDPE UHMWPE, homo PP, random PP, Ter PP, block PP, EPR, EPDM, and POE. Desirably, the thermoplastic polyolefin-based resin may include one selected from PE, PP, MAH-PP, LLDPE, HDPE, and mixtures thereof.

The intermediate layer and/or the underlayer of the flooring according to the present invention include a styrene polymer and a styrene-based resin including styrene as a main component. The styrene-based resin may include an ethylene/styrene copolymer. In an example, the styrene-based resin may include resins such as poly(styrene-b-butadiene-b-styrene) (SBS), poly(styrene-b-isoprene-styrene) (SIS), poly(styrene-butylene-b-butadiene-b-styrene) (SEBS) (poly(styrene-b-ethylene-b-butadiene-b-styrene) (SEBS)), and poly(styrene-b-ethylene-b-propylene-b-styrene) (SEPS).

[Structural Formula of SEBS]

In the styrene-based resin of the present invention, a content of the styrene is desirably in a range of 25% to 45% and is more desirably in a range of 23% to 35%. When the content of the styrene exceeds 45% in the styrene-based resin, there is a problem in compatibility with a polyolefin-based resin. When the content of styrene is less than 25%, a shrinkage rate of the intermediate layer and/or the underlayer is considerably increased, and a compression set is considerably increased. Thus, durability and dimensional stability are considerably degraded. On the other hand, when the content of the styrene is satisfied, dimension stability of the flooring is secured, and thus, a distortion phenomenon and a crack phenomenon of the flooring are prevented.

According to the present invention, in order to improve abrasion resistance, heat resistance, durability, and dimensional stability of the flooring, at least one intermediate layer and/or at least one intermediate layer include oil and a filler. During a use period of the flooring, a floor is warped by external shock, external pressure, and/or an external temperature, and particularly, the floor is warped due to a shrinkage rate difference or a distortion degree difference between layers caused by external nonuniform pressure or an external temperature being applied on the upper layer.

Specific kinds of the filler usable in the present invention are not particularly limited, and the filler may include at least one selected from inorganic-based fillers such as calcium carbonate, talc, loess, silica, and alumina; and organic-based fillers such as wood-based fillers (for example, a wood powder and a wood chip), cork, kenaf, and pulp. The filler of the present invention may have high compatibility with a resin, may exhibit smooth workability during melting, may have high affinity with a plasticizer, and may suppress elution of the plasticizer.

The filler may be contained in an amount of 500 parts by weight to 1,500 parts by weight and be desirably adjusted in a range of 1,100 parts by weight to 1,300 parts by weight, with respect to 00 parts by weight of the styrene-based resin. When the numerical range is satisfied, a shrinkage rate of the flooring is decreased to increase dimensional stability. On the other hand, when the amount of the filler applied in the present invention is too low, a reinforcing effect or the like may be insignificant. On the contrary, when the amount of the filler is excessively increased, a bonding force of other components such as a resin may be decreased to decrease workability.

The oil is not limited as long as the oil is process oil and includes paraffinic-based, naphthenic-based, or aromatic-based process oil. Desirably, the paraffinic process oil may be used. Examples of the process oil include P-1, P-2, P-3, P-4, P-5, P-6, N-1, N-2, and N-3. The oil may be included in an amount of 100 parts by weight to 300 parts by weight and be desirably adjusted in a range of 150 parts by weight to 250 parts by weight with respect to 100 parts by weight of the styrene-based resin. When a content of the oil is high, a filler filling rate in the thermoplastic polyolefin-based resin may be increased. On the contrary, when the content of the oil is too high, oil leaks from a surface of the intermediate layer and/or the underlayer as time elapses.

Engineering plastic is high performance plastic suitable for structural and mechanical components and is used as a resin aimed to mainly replace a metal or widely used in vehicle, machine, electric, and electronic components. The engineering plastic is defined as plastic that has a tensile strength of 500 Kgf/cm$^2$ or more, a flexural modulus of Kgf/cm$^2$ or more, and a heat resistance of 100° C. or more.

At least one of the intermediate layer and the underlayer in the present invention may additionally include at least one engineering plastic resin in an amount of 10 parts by weight to 100 parts by weight, and desirably, 10 parts by weight to 40 parts by weight with respect to 100 parts by weight of the styrene-based resin, wherein the at least one engineering plastic resin is selected from polyethersulfone (PES), polyether ether sulfone (PEES), polyetherimide (PEI), polyphenylene oxide (PPO), polyacetal (POM), polyamide (PA), polycarbonate (PC), polysulfone (PSF), polyphenylene sulfide (PPS), polyamideimide (PAI), polyacrylate (PAR), polyketone (PK), polyethylene terephthalate (PET), polybutylene terephtalate (PBT), nylon (NA), polyimide (PI), polyetheretherketone (PEEK), and a liquid crystal polymer (LCP). The PPO may be used as the engineering plastic. When the above range is satisfied, durability, abrasion resistance, and heat resistance of the flooring are considerably improved. When the engineering plastic is added, a content ratio of the engineering plastic to an olefin-based resin may be in a range of 30:1 to 3:1, and desirably, a range of 13:1 to 13:4.

The intermediate layer and/or the underlayer of the flooring according to the present invention nay additionally include a dynamically crosslinked thermoplastic elastomer composition (thermoplastic vulcanizate (TPV)). Examples of a crosslinked thermoplastic elastomer include ethylene propylene rubber (EPDM), nitrile butadiene rubber (NBR), natural rubber (NR), and butyl rubber. The TPV may be included in an amount of 10 parts to 100 parts by weight, and desirably, 10 parts to 50 parts by weight with respect to 100 parts by weight of the styrene-based resin. When the numerical range is satisfied, a shrinkage rate of the flooring is decreased to increase dimensional stability.

In the present invention, the flooring may be mixed with typical additives such as an ultraviolet screening agent, an antioxidant, an antibacterial agent, an antifungal agent, a deodorant, an air freshener, and a flame retardant within a range in which the object of the present invention is not impaired.

Figure 2A:
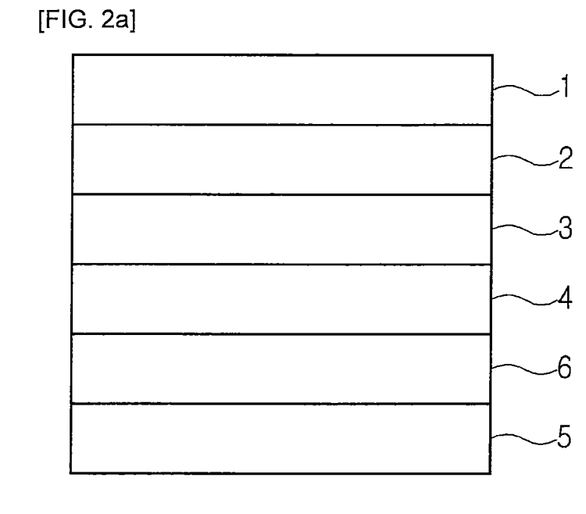
FIG. 2 is a cross-sectional view illustrating a second aspect of environmentally-friendly flooring of the present invention.
Figure 2B:
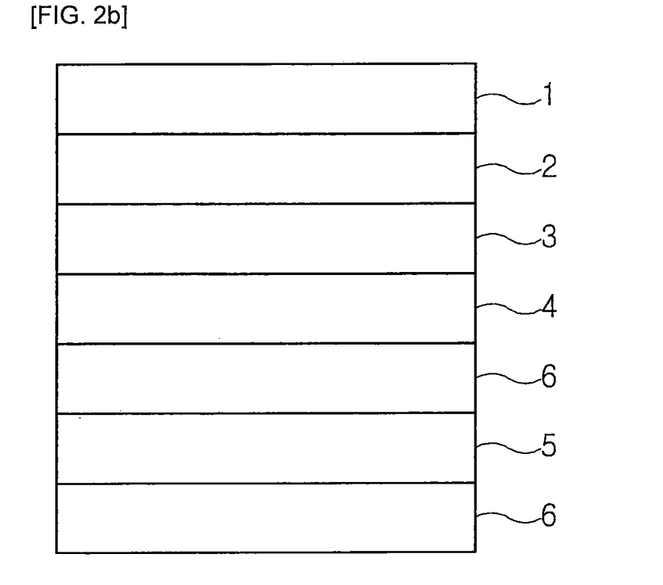
Figure 2C:
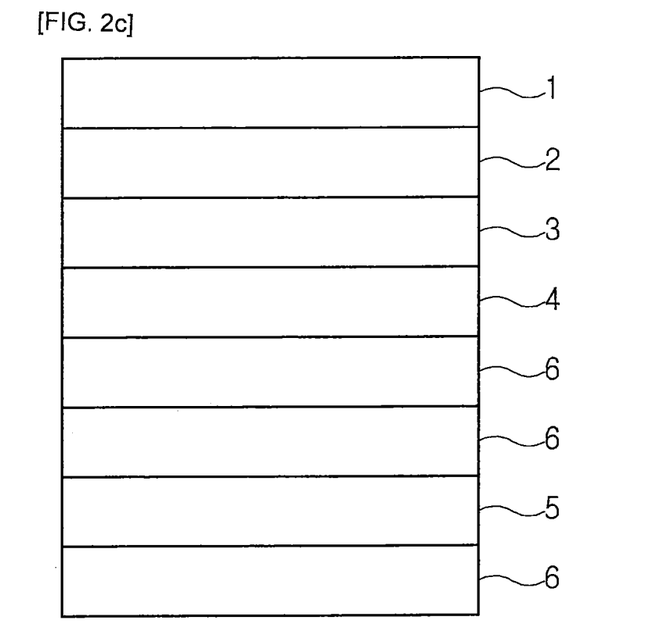

The flooring of the present invention may additionally include one or more dimensional stability layers between the intermediate layer and the underlayer and/or below the underlayer. FIGS. 2A to 2C illustrate that the flooring additionally includes one or more dimensional stability layers between the intermediate layer and the underlayer and/or below the underlayer. The dimensional stability layer may be made of at least one nonwoven fabric selected from the group consisting of a glass fiber, a carbon fiber, a polyester fiber, a polyamide fiber, a polyurethane fiber, an acrylic fiber, a polyolefin fiber, and a cellulose fiber.

Another embodiment of the present invention provides a method of manufacturing environmentally-friendly flooring, the method including (a) providing an upper layer including an ionomer and a printing layer; (b) co-extruding the upper layer and the printing layer to mold a first sheet; (c) preparing a resin composition including 50 parts by weight to 150 parts by weight of a thermoplastic polyolefin-based resin with respect to 100 parts by weight of a styrene-based resin and manufacturing a second sheet and a third sheet including an intermediate layer and an underlayer pressed from the resin composition; and (d) sequentially laminating and pressing the first sheet, the second sheet, and the third sheet manufactured in (a) and (b). In an embodiment of the invention, in the method, one or more second and/or third sheets may be manufactured and laminated in a random order. The method may additionally include laminating one or more dimensional stability layers between the intermediate layer and the underlayer or below the underlayer.

The upper layer according to the present invention includes the ionomer. An ionomer may be prepared by neutralizing an ethylene acid copolymer with one or more metal ions through a method known in the art. The ionomer may be a mixture of an ionomer and about 1 part by weight to about 50 parts by weight of an ethylene alkyl(meth) acrylate copolymer. Examples of such alkyl(meth)acrylate include one selected from methyl acrylate, ethyl acrylate, methyl methacrylate, ethyl methacrylate, propyl acrylate, propyl methacrylate, butyl acrylate, butyl methacrylate, 2-ethylhexyl acrylate, 2-ethylhexyl methacrylate, glycidyl acrylate, glycidyl methacrylate, one or more of above-described acrylates, and combinations of two or more thereof.

The ethylene acid copolymer is a polymer that may include repeat units derived from ethylene and about 1 wt % to about 50 wt %, or about 5 wt % to about 40 wt %, or 10 wt % to 25 wt % of a comonomer such as an acrylic acid, a methacrylic acid, an ethacrylic acid, or combinations of two or more thereof, with respect to the total weight of an ethylene copolymer. The ionomer is well known in the art, and detailed descriptions thereof will be omitted for the interest of brevity A transparent coating layer is laminated on the upper layer. In an embodiment, a ultraviolet (UV)-curable urethane acrylic-based resin may be applied on the upper layer, and then, UV light may be irradiated to form the coating layer, wherein the upper layer is an uppermost layer of a sheet in which the upper layer including the ionomer, the printing layer, the intermediate layer, and the underlayer are sequentially laminated. The coating layer may be made of a polyurethane-based or polyacrylic-based resin. The coating layer may additionally include typical additives such as an ultraviolet screening agent, an antioxidant, an antibacterial agent, an antifungal agent, a deodorant, an air freshener, and a flame retardant.

Figure 3A:
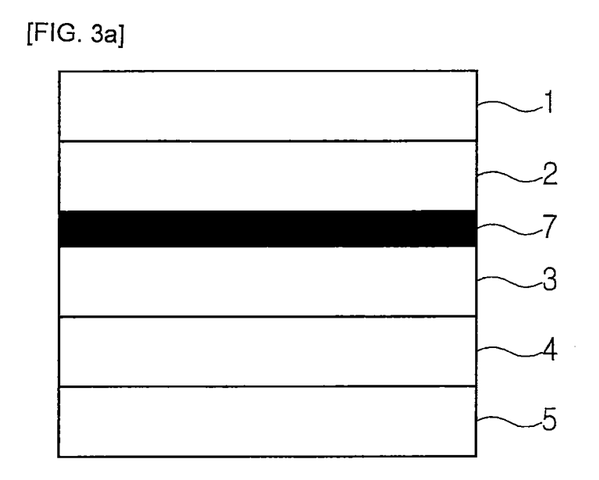
FIG. 3a is a cross-sectional view illustrating a third aspect of environmentally-friendly flooring of the present invention.
Figure 3B:
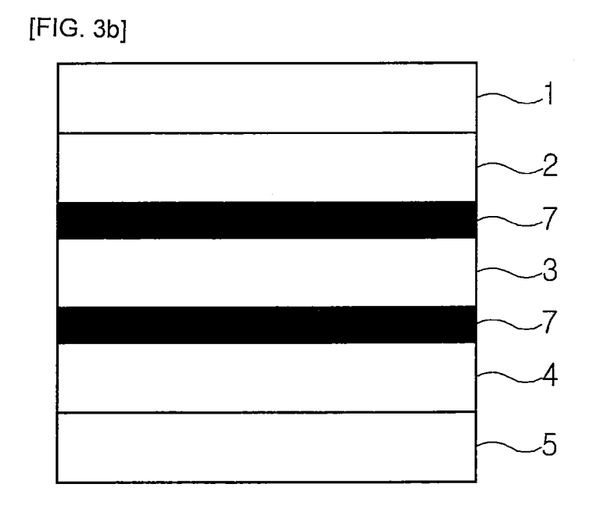
FIG. 3b is another cross-sectional view illustrating a third aspect of environmentally-friendly flooring of the present invention.

In an embodiment of the present invention, one or more primer layers may be disposed between the coating layer, the upper layer, the printing layer, the intermediate layer, and the underlayer. For example, in order to improve an adhesive force between the upper layer and the printing layer, corona discharge treatment may be performed or a primer layer may be formed on a surface of an olefin-based resin sheet. FIGS. 3A and 3B illustrate that one or more primer layers are additionally disposed between one or more layers of the coating layer, the upper layer, the printing layer, the intermediate layer, and the underlayer. The content and thickness of the primer layer may be optionally applied.

In an embodiment of the present invention, the first to third sheets may be pressed through a press process. In this case, a natural texture of the flooring may be revived, and an adhesive force between layers may also be improved. The press process is performed under appropriate pressure, time, and temperature according to the thickness and composition of the sheet. The press process may be performed twice or more at a pressure of 40 kgf/cm$^2$ to 50 kgf/cm$^2$ at a temperature of 160° C. and 170° C. for 300 seconds to 500 seconds, and desirably, for 360 seconds. When pressure is lower than the appropriate pressure, attaching between layers and molding are incomplete. When pressure is higher than the appropriate pressure, the thickness of the sheet is decreased. Thus, the upper layer is damaged and broken, which makes it difficult to implement an appropriate product thickness (3 mm to 5 mm). In addition, when pressing is not performed for an appropriate time, both ends are not attached. When a temperature is not within an appropriate temperature range, an adhesive force between the layers is weakened, resulting in deformation of the upper layer and the printing layer. The press process may be performed three or more times. When the press process is performed only once, a probability of bubble generation is high, which leads to adhesion failure.

Hereinafter, exemplary examples of the present invention will be described for promoting an understanding of the invention. However, the following examples are provided only for understanding the present invention more easily, but the content of the present invention is not limited thereby. Various other modifications and variations may be possible.

MODES OF THE INVENTION

Preparation Example 1: Preparation of Resin Composition of Intermediate Layer A and Underlayer In order to obtain an intermediate layer A, resin compositions shown in Table 1 below were prepared. A content of styrene in styrene-based resins of Examples 1 to 4 was in a range of 25% to 45%, and in the case of Comparative Examples 1 and 2, resin compositions were prepared such that a content of styrene deviates a range of the styrene.

TABLE 1

|  | styrene-based resin SEBS (styrene, %) | polyolefin-based resin* | | | | EP* | oil* | filler* calcium |
|---|---|---|---|---|---|---|---|---|
|  |  | PP | MAH-PP | LLDPE | HDPE | TPV* | PPO | oil | carbonate |
| Example 1 | 100 (29%) | 40 | 30 | 30 | 30 | — | — | 250 | 1,300 |
| Example 2 | 100 (31%) | 40 | 30 | 30 | 30 | — | — | 250 | 1,300 |
| Example 3 | 100 (33%) | 40 | 30 | 30 | 30 | — | — | 250 | 1,300 |
| Example 4 | 100 (41%) | 40 | 30 | 30 | 30 | — | — | 250 | 1,300 |
| Comparative Example 1 | 100 (13%) | 40 | 30 | 30 | 30 | — | — | 250 | 1,300 |
| Comparative Example 2 | 100 (58%) | 40 | 30 | 30 | 30 | — | — | 250 | 1,300 |

*unit: parts by weight with respect to 100 parts by weight of styrene-based resin Manufacture Example 2: Formation of Intermediate Layer B In order to obtain an intermediate layer B, resin compositions shown in Table 2 below were prepared. A composition of the intermediate layer B is a composition in which TPV is further added to a composition of the intermediate layer A.

TABLE 2

|  | styrene-based resin SEBS (Styrene, %) | polyolefin-based resin* | | | | | EP* | oil* | filler* calcium |
|---|---|---|---|---|---|---|---|---|---|
|  |  | PP | MAH-PP | LLDPE | HDPE | TPV* | PPO | oil | carbonate |
| Example 5 | 100(33%) | 40 | 30 | 30 | 30 | 10 | — | 250 | 1,300 |
| Example 6 | 100(33%) | 40 | 30 | 30 | 30 | 15 | — | 250 | 1,300 |
| Example 7 | 100(33%) | 40 | 30 | 30 | 30 | 20 | — | 250 | 1,300 |
| Example 8 | 100(33%) | 40 | 30 | 30 | 30 | 30 | — | 250 | 1,300 |

*unit: parts by weight with respect to 100 parts by weight of styrene-based resin Manufacture Example 3: Formation of Intermediate Layer C In order to obtain an intermediate layer C, resin compositions shown in Table 3 below were prepared. A composition of the intermediate layer C is a composition in which PPO as engineering plastic is further added to the composition of the intermediate layer B.

TABLE 3

|  | styrene-based resin SEBS (Styrene, %) | polyolefin-based resin* | | | | TPV* | EP* | oil* | filler* calcium |
|---|---|---|---|---|---|---|---|---|---|
|  |  | PP | MAH-PP | LLDPE | HDPE | — | PPO | oil | carbonate |
| Example 9 | 100(33%) | 40 | 30 | 30 | 30 | 20 | 10 | 250 | 1,300 |
| Example 10 | 100(33%) | 40 | 30 | 30 | 30 | 20 | 20 | 250 | 1,300 |
| Example 11 | 100(33%) | 40 | 30 | 30 | 30 | 20 | 30 | 250 | 1,300 |
| Example 12 | 100(33%) | 40 | 30 | 30 | 30 | 20 | 40 | 250 | 1,300 |
| Example 13 | 100(33%) | 40 | 30 | 30 | 30 | 20 | 50 | 250 | 1,300 |

TABLE 3-continued

| | styrene-based resin SEBS (Styrene, %) | polyolefin-based resin* PP | MAH-PP | LLDPE | HDPE | TPV* — | EP* PPO | oil* oil | filler* calcium carbonate |
|---|---|---|---|---|---|---|---|---|---|
| Example 14 | 100(33%) | 40 | 30 | 30 | 40 | 20 | 40 | 250 | 1,300 |
| Example 15 | 100(33%) | 40 | 30 | 30 | 45 | 20 | 45 | 250 | 1,300 |

1) SEBS: styrene-ethylene-butylene-styrene copolymer manufactured by KRATON
2) PP: polypropylene manufactured by LG Chem
3) MAH-PP: maleic anhydride grafted polypropylene manufactured by Lotte Chemical
4) LLDPE: linear low density polyethene manufactured by LG Chem
5) HDPE: high density polyethylene manufactured by LG Chem
6) TPV: dynamic crosslinkable thermoplastic Elastomer manufactured by ExxonMobil
7) EP: engineering plastic manufactured by SABIC, polyphenylene oxide (PPO)
8) oil: process oil manufactured by MICHANG Petroleum Industry
9) filler manufactured by Omya Korea, calcium carbonate Experimental Example 1: Evaluation of Physical Properties of Intermediate Layer The intermediate layers A to C prepared in Preparation Example 1 were used to form sheets, and then, physical properties thereof were evaluated by the following method and shown in Tables 4 to 6. A target layer is a layer attached to an intermediate layer like an upper layer or an underlayer when flooring is manufactured. In the present experiment, the target layer is a sheet made of a composition including an ethylene-acrylic acid copolymer (EAA) as a main component.

Evaluation Method 1) shrinkage rate: after the formed sheet was left at room temperature for 24 hours, a flow direction of a resin composition and a change rate of a length of the resin composition in a vertical direction was measured.

2) change rate of heated length: after the formed sheet was left at a temperature 80° C. for 6 hours and then cooled at room temperature for 1 hour, an average value of three change rates was measured.

3) heating loss rate: after the formed sheet was left at 100° C. for 6 hours and cooled at room temperature for 1 hour, and then, a heating loss rate was measured.

4) compression set (C/S): After the formed sheet was left at a temperature of 45° C. for 22 hours and cooled at room temperature for 1 hour, and then, a change rate of a thickness was measured.

5) specific gravity: specific gravity was measured using a specific gravity meter (MD-300S manufactured by Alfa Mirage Co. LTD)

TABLE 4

| physical results | content of styrene [%] | shrinkage rate [%] flow direction | shrinkage rate difference | C/S vertical direction | shrinkage rate difference | specific gravity [%] | [—] |
|---|---|---|---|---|---|---|---|
| Target | — | 0.82 | | 0.24 | | — | 0.9 |
| Example 1 | 29 | 0.89 | +0.07 | 0.39 | +0.15 | 67 | 1.72 |
| Example 2 | 31 | 0.73 | −0.09 | 0.34 | +0.10 | 58 | 1.72 |
| Example 3 | 33 | 0.77 | −0.05 | 0.22 | −0.02 | 68 | 1.72 |
| Comparative Example 1 | 13 | 0.94 | +0.12 | 0.41 | +0.17 | 56 | 1.72 |
| Comparative Example 2 | 58 | 0.63 | −0.19 | 0.46 | +0.22 | 73 | 1.72 |

According to Table 4, in the case of Example 3 in which a content of styrene in a styrene-based resin was 33%, a shrinkage rate was smaller in both a flow direction and a vertical direction as compared with Comparative Example 2. On the other hand, in the case of Comparative Examples 1 and 2, since a shrinkage rate difference in with respect to the target layer (upper layer) is very large, it can be seen that there is a high possibility that a distortion phenomenon occurs in the sheet.

In the case of PVC flooring, since constituent materials of respective layers are mostly the same PVC, a shrinkage rate of a sheet is relatively easy controlled. When materials of the respective layers are different, a floor warpage phenomenon is likely to occur to a shrinkage rate difference. As described above, the control of a shrinkage rate between layers is important for dimensional stability and durability of flooring. In the present invention, the dimensional stability and durability of the flooring are secured by easily controlling a shrinkage rate.

TABLE 5

| physical results | content of styrene [%] | shrinkage rate [%] | | C/S [%] | specific gravity [—] | tensile strength [MPa] | elongation [%] |
|---|---|---|---|---|---|---|---|
| | | flow direction | vertical direction | | | | |
| Target | — | 0.82 | 0.24 | — | 0.9 | — | — |
| Example 5 | 33 | 0.8 | 0.22 | 72 | 1.72 | 63 | 102 |
| Example 6 | 33 | 0.8 | 0.23 | 70 | 1.73 | 60 | 121 |
| Example 7 | 33 | 0.81 | 0.23 | 67 | 1.72 | 58 | 120 |

| physical results | content of styrene [%] | change rate of heated length [%] | heating loss rate [%] | wettability [—] | flatness [—] | sheet performance | |
|---|---|---|---|---|---|---|---|
| | | | | | | oil performance (90° C.) | tactility (rough) |
| Target | [—] | 0.25 or less | 0.5 or less | ○ | ○ | ○ | ○ |
| Example 5 | 33 | 0.14 | 0.2 | ○ | ○ | ○ | ○ |
| Example 6 | 33 | 0.13 | 0.17 | ○ | ○ | ○ | ○ |
| Example 7 | 33 | 0.13 | 0.18 | ○ | ○ | ○ | ○ |

(○: excellent, Δ: normal, X: defective)

According to Table 5, Example 7 had excellent wettability, flatness, and sheet performance.

TABLE 6

| physical results | content of styrene [%] | shrinkage rate [%] | | C/S [%] | specific gravity [—] | tensile strength [MPa] | elongation [%] |
|---|---|---|---|---|---|---|---|
| | | flow direction | vertical direction | | | | |
| Target | — | 0.82 | 0.24 | — | 0.9 | — | — |
| Example 9 | 33 | 0.79 | 0.22 | 60 | 1.72 | 64 | 144 |
| Example 10 | 33 | 0.79 | 0.21 | 48 | 1.72 | 66 | 136 |
| Example 11 | 33 | 0.77 | 0.2 | 28 | 1.72 | 67 | 128 |
| Example 12 | 33 | 0.77 | 0.2 | 13 | 1.72 | 69 | 114 |
| Example 13 | 33 | 0.76 | 0.19 | 12 | 1.72 | 70 | 128 |

| physical results | change rate of heated length [%] | heating loss rate [%] | wettability [—] | workability [—] | sheet performance | |
|---|---|---|---|---|---|---|
| | | | | | oil performance (90° C.) | tactility (rough) |
| Target | 0.25 or less | 0.5 or less | ○ | ○ | ○ | ○ |
| Example 9 | 0.18 | 0.17 | ○ | ○ | ○ | ○ |
| Example 10 | 0.18 | 0.18 | ○ | ○ | ○ | ○ |
| Example 11 | 0.17 | 0.19 | ○ | ○ | ○ | ○ |
| Example 12 | 0.16 | 0.18 | ○ | ○ | ○ | ○ |
| Example 13 | 0.16 | 0.18 | Δ | Δ | ○ | Δ |

According to Table 6, all of Examples 9 to 12 had excellent wettability, flatness, and sheet performance.

Experimental Example 2: Manufacture and Evaluation of Physical Properties of Flooring (1) An upper layer including an ionomer (surlyn) and an olefin-based printing layer film were sheet-molded using an extruder, the compositions of the intermediate layers of Examples 12, 14, and 5, and Comparative Example 5 were mixed using a Banbury mixer, and sheets were molded through a calender process. An underlayer sheet including a composition according to Table 7 below was formed in the same manner as in an intermediate layer. Each layer was laminated through a press process, and an optimum molding cycle of the press process was performed in such a manner that high temperature pressing was performed twice at a temperature of 160° C. to 170° C. at a pressure of 40 kgf/cm² for 300 seconds, and then, cooling was performed once. Then, a UV coating layer was applied on the upper layer.

TABLE 7

| | styrene-based resin | Polyolefin-based resin* | | | | | oil* | filler* calcium |
|---|---|---|---|---|---|---|---|---|
| | SEBS(Styrene, %) | PP | MAH-PP | LLDPE | HDPE | POE | oil | carbonate |
| underlayer | 100(33%) | 40 | 30 | 30 | 30 | 30 | 250 | 1500 |

*unit: parts by weight with respect to 100 parts by weight of styrene-based resin (2) Physical properties of the manufactured flooring were evaluated according to the following method.

1) change rate of heated length: after the manufactured flooring was left at a temperature 80° C. for 6 hours and then cooled at room temperature for 1 hour, an average value of three change rates was measured.

2) heating loss rate: after the manufactured flooring was left at 100° C. for 6 hours and cooled at room temperature for 1 hour, an average value of three change rates was measured 3) residual indentation modulus: after a load of 36.3 kgf is loaded on the manufactured flooring for 10 minutes and removed, a residual indentation modulus was measured after 60 minutes.

TABLE 8

| physical results | indentation amount (20° C.) [mm] | indentation amount (45° C.) [mm] | residual indentation modulus [mm] | change rate of heated length [%] | heating loss rate [%] |
|---|---|---|---|---|---|
| Target | 0.25 or less | 1.20 or less | 8.0 or less | 0.25 or less | 0.5 or less |
| Example 12 | 1.2 | 1.3 | 6 | 0.1 | 0.1 |
| Example 14 | 0.3 | 0.4 | 7 | 0.1 | 0.2 |
| Example 15 | 0.2 | 0.3 | 6 | 0.1 | 0.1 |

As shown in Table 8, it could be confirmed that dimensional stability of the flooring of Comparative Example 5 was considerably lower as compared with Examples. In particular, Comparative Example 5 had a residual indentation modulus of 37% and thus was very vulnerable to load, but Examples had a higher elastic restoring force against load.

| Reference Numerals |
|---|
| 1: coating layer  2: upper layer  3: printing layer |
| 4: intermediate layer  5: underlayer  6: dimensional stability layer |
| 7: primer layer |

The invention claimed is:

1. An environmentally-friendly flooring comprising:
a coating layer;
an upper layer including an ionomer;
a printing layer;
at least one intermediate layer; and
at least one underlayer, which are sequentially laminated,
at least one of the intermediate layer and the underlayer includes a thermoplastic polyolefin-based resin, a styrene-based resin, oil, and a filler, the thermoplastic polyolefin-based resin is included in an amount of 50 parts by weight to 150 parts by weight with respect to 100 parts by weight of the styrene-based resin, and the styrene-based resin includes styrene in an amount of 25% to 45,
wherein at least one of the intermediate layers and the underlayer includes 10 parts by weight to 50 parts by weight of thermoplastic vulcanizate (TPV) with respect to 100 parts by weight of the styrene-based resin,
wherein a shrinkage rate of the upper layer is in a range of 0.7% to 0.9% in a flow direction and in a range of 0.2% to 0.4% in a vertical direction.

2. The environmentally-friendly flooring of claim 1, wherein the styrene-based resin includes the styrene in the amount of 25% to 35%.

3. The environmentally-friendly flooring of claim 1, wherein at least one of the intermediate layer and the underlayer additionally includes 10 parts by weight to 50 parts by weight of at least one engineering plastic resin with respect to 100 parts by weight of the styrene-based resin, wherein the at least one engineering plastic resin is selected from polyethersulfone (PES), polyether ether sulfone (PEES), polyetherimide (PEI), polyphenylene oxide (PPO), polyacetal (POM), polyamide (PA), polycarbonate (PC), polysulfone (PSF), polyphenylene sulfide (PPS), polyamideimide (PAI), polyacrylate (PAR), polyketone (PK), polyethylene terephthalate (PET), polybutylene terephtalate (PBT), nylon (NA), polyimide (PI), polyetheretherketone (PEEK), and a liquid crystal polymer (LCP).

4. The environmentally-friendly flooring of claim 1, wherein at least one of the intermediate layer and the underlayer includes 500 parts by weight to 1,500 parts by weight of the filler and 100 parts by weight to 300 parts by weight of the oil with respect to 100 parts by weight of the styrene-based resin.

5. The environmentally-friendly flooring of claim 1, wherein the styrene-based resin includes at least one selected from poly(styrene-b-butadiene-b-styrene) (SBS), poly(styrene-b-isoprene-styrene) (SIS), poly(styrene-butylene-b-butadiene-b-styrene) (SEBS), and poly(styrene-b-ethylene-b-propylene-b-styrene) (SEPS).

6. The environmentally-friendly flooring of claim 1, wherein the thermoplastic polyolefin-based resin includes one selected from polyethylene, polypropylene, MAH-PP (Maleic Anhydride-PP), LLDPE (Linear Low-Density Polyethylene), HDPE (High-Density Polyethylene), and mixtures thereof.

7. The environmentally-friendly flooring of claim 1, wherein one or more dimensional stability layers are additionally provided between the intermediate layer and the underlayer and/or below the underlayer.

8. The environmentally-friendly flooring of claim 1, wherein one or more primer layers are provided between the coating layer, the upper layer, the printing layer, the intermediate layer, and the underlayer.

* * * * *